United States Patent

[11] 3,554,170

[72] Inventors Rudolf Schenk
 Pocking, Kreis Starnberg;
 Fritz Flory, Munich, Germany
[21] Appl. No. 813,784
[22] Filed Jan. 27, 1969
[45] Patented Jan. 12, 1971
[73] Assignee Kugelfischer Georg Schafer & Co.
 Schweinfurt, Germany

[54] CARBURETION CONTROL METHOD FOR OPERATING FUEL INJECTION SPARK-IGNITION INTERNAL COMBUSTION ENGINES
2 Claims, 7 Drawing Figs.

[52] U.S. Cl. .................................................. 123/32,
 123/119, 123/139, 123/140
[51] Int. Cl. ....................................................F02m 45/00
[50] Field of Search........................................... 123/32,
 32SPA, 32STR, 119, 139.17, 139.18, 140.3,
 140.31, 117.1

[56] References Cited
UNITED STATES PATENTS
3,027,884 4/1962 Bale, Jr. et al. ............... 123/117.1

| 3,054,393 | 9/1962 | Schmidt ....................... | 123/139 |
| 3,146,770 | 9/1964 | Garcea ........................ | 123/140 |
| 3,315,650 | 4/1967 | Bishop et al. ................ | 123/32 |
| 3,336,912 | 8/1967 | Morris ........................ | 123/140 |
| 3,353,524 | 11/1967 | Sarto .......................... | 123/117.1 |
| 3,359,958 | 12/1967 | Von Seggern et al. ......... | 123/32STR |

OTHER REFERENCES
Internal Combustion Engines by Gill Smith Zurys pges 6–4 through 6–9.

Primary Examiner—Laurence M. Goodridge
Attorney—Stevens, Davis, Miller & Mosher

ABSTRACT: A method for operating an internal combustion engine of the fuel injection spark-ignition type, whereby at no-load idling speed the engine is operated under conditions of excess air relative to the stoichiometric mixture ratio, the degree of excess air being gradually diminished in conformity with the engine speed diminishing from the no-load idling speed.

CARBURETION CONTROL METHOD FOR OPERATING FUEL INJECTION SPARK-IGNITION INTERNAL COMBUSTION ENGINES

The present invention is directed to the improvement of the combustion characteristics in an internal combustion spark-ignition engine through the application of certain principles for determining the fuel-air mixture for particular operating conditions.

More specifically, the present invention teaches that improved engine efficiency can be realized through adjustment of the rates of fuel and air supply according to a novel relationship between engine speed and said rates of supply.

It is known, in the operation of internal combustion engines of the fuel injection spark-ignition type, that in order to maintain stable idle running conditions and stable conditions while running under light load, the fuel-air mixture is substantially enriched relative to the maximum fuel which is required at a particular speed. Such a condition, while providing stability, however, provides incomplete combustion and a correspondingly high proportion of carbon monoxide in the engine exhaust gases. This condition is highly undesirable not only from the point of view of economy as to fuel consumption, but also from the point of view of air pollution and contamination, a matter of increasing and, in fact, critical concern in the present day.

In accordance with the present invention, on the other hand, under light-load or idling conditions, the engine may be operated with an excess air supply, thereby markedly reducing and possibly completely eliminating the presence of exhaust carbon monoxide.

An object of this invention, therefore, is to generally improve engine operation in engines of the type referred to herein, through improved carburetion characteristics at idling and light-load running conditions.

A more specific object is to increase engine efficiency and economy through reduction of fuel consumption at idling and light-load running conditions.

A still further object is to improve engine operation through reduction and possible elimination of carbon monoxide from the engine exhaust gases at idling and light-load running conditions.

Other objects are those which are inherent in the invention as disclosed herein which will now be described in detail with reference to the accompanying drawing, wherein:

FIG. 1 is a graphical representation of quantity of fuel injected at various engine speeds for realizing maximum torque, the dash line curve being the reference curve and representing actual theoretical values and the solid line being a control curve representing practical operating conditions in accordance with conventional operating procedures, the abscissa being calibrated in units of revolutions per minute and the ordinate in units of cubic millimeters of fuel per stroke per cylinder;

Figure 1:
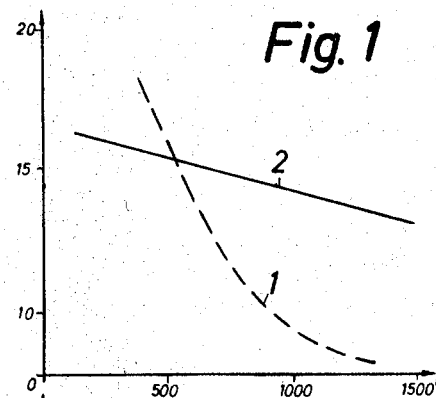
Figure 3:
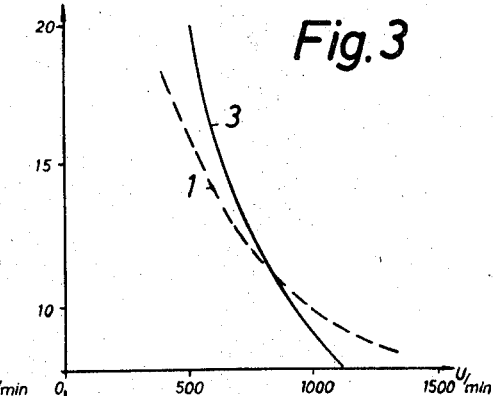
FIG. 3 is analogous to FIG. 1 excepting that the solid line therein represents the fuel-air ratio in accordance with this invention.
Figure 7:
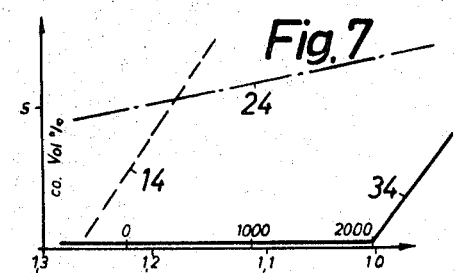
Figure 6:
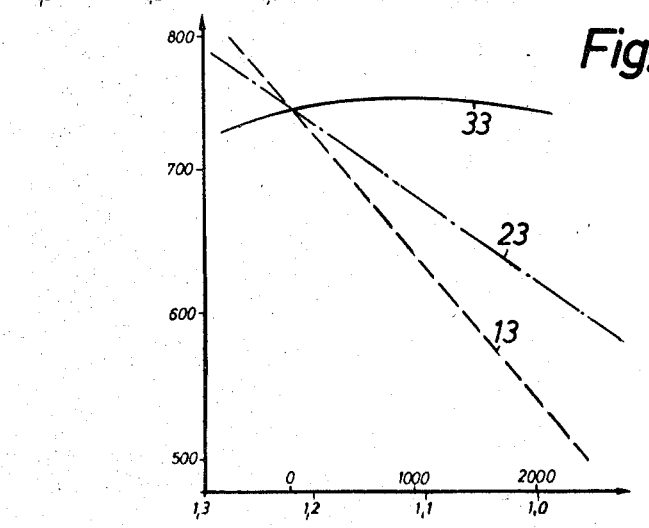

In FIGS. 6 and 7, the abscissa is calibrated according to two scales, the upper indicating altitude in units of meters above sea level and the lower one indicating the specific gravity of air in units of kilograms per cubic meter; the ordinate in FIG. 6 indicates engine speed in r.p.m. while in FIG. 7 the ordinate indicates percentage of carbon dioxide in the exhaust gases, the respective curves in FIGS. 6 and 7 corresponding to the conditions depicted by the various curves in FIGS. 1 and 3. It is to be noted that although the ordinate in each of FIGS. 1 and 3 is calibrated in volumetric units, this is equivalent to weight units for a particular fuel. Further, since the abscissa in each of FIGS. 1 and 3 is calibrated in r.p.m., it logically derives that the respective curves 1, 2, and 3 in FIGS. 1 and 3 represent weight rates of fuel fed to the engine.

With reference to FIG. 1, reference curve 1 denotes fuel quantity per cylinder per stroke, that is, the weight rate of fuel, at idling according to basic operating requirements for achieving maximum torque at a particular constant throttle setting. The gradient or slope of curve 1 results, as is well known, from the fact that, at constant throttle setting the weight rate of air intake per stroke increases as the engine speed decreases and also from the fact that a particular constant ratio of fuel to air is required in order to realize maximum power along each point of curve 1.

The points which define curve 1 are the summit or peak points each taken from a respective curve in a family of curves which are plotted to represent engine power as against the air ratio $\lambda$, at constant speed and constant mass air flow, the air ratio being the ratio of quantity of dry air actually fed to the cylinder divided by the quantity of dry air theoretically needed for complete combustion, which theoretical quantity depends on the kind of fuel used. Since curve 1 in FIG. 1 represents locus of the peak points in each curve of said family of curves, and since the power falls off with either a weakening or an enriching of the fuel-air mixture relative to said peak points, curve 1 in FIG. 1 represents unstable operating conditions and in actual practice it is sought to avoid operation of the engine in accordance with curve 1.

Figure 2:
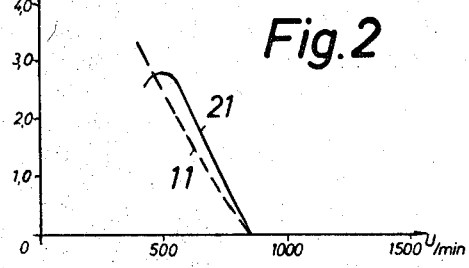
FIG. 2 is a graphical representation of torque against engine speed corresponding to the operating conditions represented by the lines of FIG. 1, the abscissa being calibrated in units of revolutions per minute and the ordinate in units of meter-kilograms.

In actual practice, therefore, and according to conventional techniques, the engine is operated pursuant to control curve 2 according to which the fuel-air mixture is substantially enriched relative to curve 1. It is seen from FIG. 1 that at the no-load idling speed, that is: the speed at which the fuel combustion is just sufficient to meet the engine internal power requirements and at which no torque is available for external driving power (FIG. 2 shows this to be about 800 r.p.m.), there is a considerable difference between the weight rates of fuel drawn into the engine according to curves 1 and 2, respectively. Since enrichment of the fuel-air mixture relative to operation according to curve 1, at the no-load idling speed, that is: increasing the ratio of fuel to air at a constant volume of air thereby lowering the air ratio $\lambda$, would result in a lowering of the engine torque and a consequent reduction in the engine speed from the no-load idling speed, operation according to curve 2 requires that an increased weight rate of air is fed to the engine in order to maintain the no-load torque and speed operating conditions. According to control curve 2 in FIG. 1, it is seen that the fuel weight rate increases slightly with falling engine speed relative to operation according to reference curve 1. When the engine is placed under load and the speed thereof accordingly drops to below the no-load idling speed, operation pursuant to curve 2 provides greater stability than operation pursuant to curve 1 because of the steeper slope of torque curve 21 (FIG. 2) as compared to torque curve 11, these torque curves 21 and 11 corresponding to curves 2 and 1, respectively. The explanation for this resides in the fact that as the engine speed drops the weight rate of air drawn in per piston stroke for a constant throttle setting increases because, as is well known, the engine draws in more air per stroke at lower speeds than at higher speeds. As the engine speed decreases, therefore, the air flow weight rate increases thereby providing a leaner mixture approaching the stoichiometric mixture ratio and the torque output consequently increases. With reference to curve 21, therefore, as the engine speed decreases the torque increases towards a maximum value because although the fuel weight rate increases there is simultaneously a considerable increase in the air weight rate, the maximum torque value occurring substantially in the region of occurrence of the stoichiometric ratio value in the fuel-air mixture. Upon dropping of the engine speed below the speed corresponding to the maximum torque value on curve 21, the torque value drops off sharply because of rapidly increasing air ratio. The slope of curve 21 is even greater at speeds below the maximum torque value speed than it is at speeds higher than the maximum torque speed. In fact, the torque falls off so sharply after attainment of maximum torque that the engine will immediately stall if it even were to slow down a very small amount from the peak torque value on curve 21.

Accordingly, pursuant to known techniques for engine operation, such as illustrated by curves 2 and 21, the speed at which the stoichiometric mixture ratio occurs with a fixed throttle setting, is below the normal idling speed range of the engine so that the engine is self-stabilizing when it is subjected to load while at no-load idling speed. The disadvantage, however, inherent in the known techniques is that fuel consumption and content of carbon monoxide in the exhaust gases are particularly high during idling conditions. The high carbon monoxide content results, of course, from incomplete combustion of the fuel at air ratios below the stoichiometric ratio.

FIG. 3 illustrates a control curve 3 pursuant to the control technique of the present invention. Reference curve 1 from FIG. 1 is repeated in FIG. 3 to facilitate comparison. As is evident, the slope of control curve 3 is steeper than that of reference curve 1 whereby for a given change in engine speed there is a greater change in weight rate of fuel intake according to curve 3 than according to curve 1.

Figure 4:
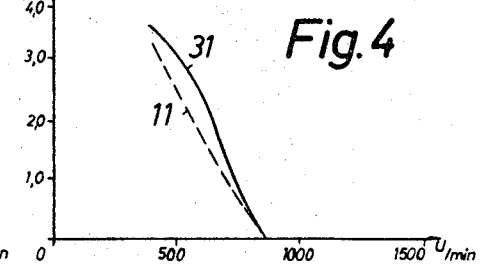
FIG. 4 is analogous to FIG. 2 and is a graphical representation of torque against engine speed corresponding to operating conditions represented by the lines of FIG. 3.

In accordance with the present invention, the engine idles at no-load under conditions of excess air ($\lambda$ greater than 1). At the no-load idling speed, which is determined from FIG. 4 wherein curves 11 and 31 respectively correspond to the conditions of curves 1 and 3, respectively, the weight rate of fuel intake according to control curve 3 is substantially the same as it would be for operation according to reference curve 1. While operating according to curve 31, that is: with excess air, in order to obtain the same idling speeds and concomitant torque outputs, it is necessary to increase the total weight rate of air intake above the weight rate of air intake values which are determined by curve 11. In other words, the reduced torque output which results from the leanness of the mixture is compensated for by an increase in the total weight rate of combustible mixture which is drawn into the engine which in turn increases the torque output. In operation, according to curve 3, if a load is applied to the engine while it is at no-load idling speed, the speed will decrease but the air weight rate intake will increase with decreasing engine speed as previously explained. The increase in air weight rate flow without a simultaneous increase in fuel weight rate would, however, render the mixture even leaner than at no-load speed and would result in a marked reduction in torque output. Instead, the increase in air weight rate flow must be accompanied by a simultaneous increase in fuel weight rate in order to realize a proper ratio of fuel to air whereby the torque output increases not only to an extent necessary to compensate for the increase in the air ratio $\lambda$ but also to provide the additional torque required by the load. As is evident from FIG. 3, the fuel weight rate for operation according to curve 3 increases to such a marked extent as the engine speed decreases and the air weight rate intake increases, that the air ratio $\lambda$ decreases; however, because of the large excess of air at no-load idling speed, the air ratio $\lambda$ remains higher than that corresponding to the stoichiometric ratio. As the engine speed decreases according to curve 31, the fuel-air mixture approaches more and more the stoichiometric ratio and the torque consequently increases. The torque also increases because of an increasing volumetric efficiency in the engine, this increase in volumetric efficiency being normal to reduced engine speeds. The dual torque increasing effect is reflected in the steepness of torque curve 31 in FIG. 4.

Figure 5:
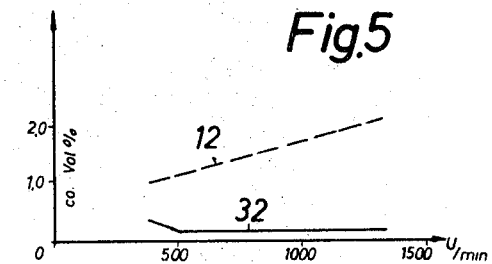
FIG. 5 is a graphical representation of percentage of carbon monoxide in exhaust gases plotted against engine speed corresponding to the operating conditions represented by the lines of FIG. 3.

At a predetermined engine speed the stoichiometric ratio is achieved and the torque curve 31 flattens out, this corresponding to maximum torque output based upon the mixture ratio. Up until this point, the content of carbon monoxide in the exhaust gases would be constant and of such an extremely low value that it could not be reduced further, as is illustrated by curve 32 in FIG. 5. When the stoichiometric ratio is reached, the carbon monoxide content increases sharply. Curve 12 in FIG. 5 shows the marked abundance of carbon monoxide when operating according to curve 1 relative to curve 32 which corresponds to operation according to curve 3. The gradient of curve 3 is selected so that a large excess of air is provided at no-load idling speed and so that the speed at which the stoichiometric ratio occurs is below the no-load idling speed. When the engine speed increases from the idling speed under load to beyond the no-load idling speed, for example: when the engine drives a vehicle which is descending a hill, there is according to curve 3 a sharp reduction in the weight rate of fuel delivered to the engine, this causing a sharp reduction in torque output as is shown by curve 31. The engine speed, however, increases as a result of the kinetic energy of the vehicle as it descends the hill and this increase in engine speed is accompanied by an increase in the internal power requirements of the engine. So long as the kinetic energy of the vehicle acts upon the engine, it will continue to run at the increased speed; however, when this kinetic energy ceases to act upon the engine, as would occur by operation of the transmission clutch disconnecting the engine from the vehicle wheels, the fuel weight rate for idling conditions determined by curve 3 is insufficient to maintain the higher engine speed. The speed, therefore, decreases until the no-load idling speed is reached. If the speed should for some reason decrease to below the no-load idling speed, the engine will operate according to curve 31, the air and fuel weight rates increasing and thereby providing increased torque thereby returning the engine to its no-load idling speed. It is seen, therefore, that the engine speed is self-stabilized to the value of the no-load idling speed by virtue of operation according to curve 3. It is further seen that the self-stabilization of the engine speed is much more positive according to curve 3 than according to curves 1 or 2 because during operation under conditions of excess air the power characteristic (curve 31) changes more sharply in dependence upon the air ratio $\lambda$ than is the case while operating under conditions of air deficiency. Further, the control provided by curve 3, even upon the occurrence of changes in the specific mass air flow, is much superior than the control provided by either curves 1 or 2.

FIG. 6 shows the relationship between the no-load idling speed and the specific mass of air which is drawn into the engine. In this regard, it should be noted that at altitudes above sea level the specific gravity of ambient air decreases so that the mass of the air which is drawn into the engine decreases although the volume of air drawn in may be the same as at sea level. It is seen from FIG. 6 that operation according to the present invention (curve 33) provides a substantially constant no-load idling speed as the altitude increases and there is a consequent drop in volumetric efficiency because of the decreasing specific mass of the ambient air. According to the present invention, the drop in volumetric efficiency is balanced or compensated for by an enrichment of the fuel-air mixture.

According to other control techniques which operate at no-load under conditions of air deficiency (rich fuel-air mixtures) and in the immediate vicinity of the stoichiometric ratio, the aforementioned enrichment of the mixture, as the altitude increases, results in a sharp falling off of the torque and of the engine speed as is shown by curves 23 and 13 in FIG. 6, this falling off of the torque being occasioned by the fact that as the altitude increases the volumetric efficiency decreases and less mass of air is drawn into the cylinders.

It is true that this fall in torque does indeed also arise in the method of control according to the present invention if one exceeds the stoichiometric mixture ratio but the occurrence of this point can be determined by choosing the degree of excess air and by choosing the gradient of the control curve, and in fact this point is reached earlier with a steep gradient than with a flatter gradient for the control curve 3. On the other hand, stabilization of idling is better with a steep gradient than with a flat gradient for the control curve. For practical operation a curve is chosen according to the type of engine, so that the gradient does not lie too close to that of the reference curve 1 since stabilization with the latter curve is not sufficiently pronounced, but the gradient must equally not be too steep since otherwise, as explained above, the stoichiometric ratio would be reached with too small a fall in speed below the actual idling speed.

FIG. 7 illustrates the carbon monoxide content relative to the specific mass of air when operating in accordance with the a various control curves. On account of the high excess of air there is almost no carbon monoxide present in the exhaust gases according to the present invention (curve 34) right up to the point of attainment of the stoichiometric ratio, while curve 14, corresponding to reference curve 1, and curve 24, corresponding to control curve 2, illustrate a substantially higher carbon monoxide content. The carbon monoxide content increases most sharply with the curve 14 but more flatly with the curve 24, which follows from the above explanation in both cases, while according to curve 34 there is almost no carbon monoxide in the exhaust gases up to the point where the stoichiometric ratio is reached. Only when the stoichiometric ratio is exceeded does the carbon monoxide curve 34 start to climb in accordance with the increasing quantity of fuel delivered with falling engine speed.

Since in this method even with small variation in speed of the engine substantially greater reductions of the quantity of fuel injected are necessary as compared with the previously known methods, heavy demands are made on the delivery control and on the matching of the timing of the altered fuel delivery quantity with a change in speed. This naturally requires a fuel injection pump with a very small variation in its delivery characteristics and a control system which responds rapidly over the whole operating range.

The invention is applicable to such spark-ignition fuel injection internal combustion engines which hitherto have been operated in the idling range with an air ratio λ smaller than 1, i.e. with a fuel to air ratio of about 1:10.8, the stoichiometric fuel to air ratio (i.e. that fuel to air ratio providing an air ratio equal to 1 and thus indicating that quantity of air theoretically necessary for the complete combustion of a certain quantity of fuel) being 1:14.4 A fuel-air ratio of about 1:16 is an example of operation according to this invention.

In summary, the invention entails a controlling of the fuel-air mixture which is supplied to the engine, in accordance to parameters which are preprogrammed into the engine carburetion control system so that such control will automatically be realized during operation of the engine. An example of a carburetion control system to which the invention is applicable is that disclosed in U.S. Pat. No. 2,858,822.

According to this invention, the fuel-air mixture which is controlled is the fresh mixture which is fed to the engine, specifically, to the intake manifold.

The present disclosure is intended to embrace within its scope any and all variations or modifications which are either obvious or well within the purview of one skilled in the art, the herein presented description of the inventive concept being illustrative and not being intended as limitative of the scope of the invention.

We claim:

1. A method of controlling a spark-ignition fuel injection internal combustion engine of the type wherein the fuel and air charge is distributed homogeneously throughout the cylinder, said method comprising the use of a control system and the preprogramming of same to automatically control the fuel-air ratio in the fuel-air mixture which is fed to the engine in relation to the engine speed, wherein said control system is so programmed as to provide at no-load idling speed an air ratio in said mixture of greater than the stoichiometric air ratio, and said system is further programmed to, at engine speeds below said no-load idling speed, provide an increase in fuel rate in accordance with a control curve plots to show the relationship between engine speed and fuel rate, the gradient of said curve along the fuel rate coordinate being greater than that which is necessary for maintaining the fuel to air ratio constant for no-load idling speed and other lower idling speeds, whereby a decrease in the idling speed from no-load idling speed results in an increase in the fuel-air ratio towards the point along said curve corresponding to maximum torque output of the engine.

2. The method of claim 1, applied to a spark-ignition fuel injection internal combustion engine having a control system which receives signals indicative of the position of the throttle valve and of the engine speed, respectively, these signals being as a whole indicative of the air flow in the induction pipe of the engine and acting upon a device on which the necessary control curves for obtaining the fuel-air ratio desired for each operating point of the engine are recorded to provide a control signal acting upon the fuel injection pump of the engine to adjust the fuel quantity to be delivered by the injection pump.